(12) United States Patent
Rodriguez et al.

(10) Patent No.: US 8,542,093 B2
(45) Date of Patent: Sep. 24, 2013

(54) NETWORKED MOVABLE BARRIER OPERATOR SYSTEM

(75) Inventors: Yan Rodriguez, Suwannee, GA (US); Ben L. Garcia, Conyers, GA (US)

(73) Assignee: QMotion Incorporated, Pensacola, FL (US)

( * ) Notice: Subject to any disclaimer, the term of this patent is extended or adjusted under 35 U.S.C. 154(b) by 1090 days.

(21) Appl. No.: 11/704,126

(22) Filed: Feb. 8, 2007

(65) Prior Publication Data
US 2007/0146118 A1 Jun. 28, 2007

Related U.S. Application Data

(63) Continuation-in-part of application No. 10/988,104, filed on Nov. 12, 2004.

(51) Int. Cl.
*B60R 25/00* (2013.01)

(52) U.S. Cl.
USPC .......... 340/5.71; 340/5.51; 340/5.61

(58) Field of Classification Search
USPC .......... 340/825, 5.1, 5.2, 5.7, 5.71, 825.69, 340/5, 3.5, 9.1, 5.51
See application file for complete search history.

(56) References Cited

U.S. PATENT DOCUMENTS

| | | | |
|---|---|---|---|
| 5,414,624 A | 5/1995 | Anthonyson | 364/424.01 |
| 5,875,395 A | 2/1999 | Holmes | 455/420 |
| 5,903,226 A * | 5/1999 | Suman et al. | 340/12.28 |
| 6,120,262 A | 9/2000 | McDonough et al. | 417/424.1 |
| 6,155,160 A | 12/2000 | Hochbrueckner | 99/331 |
| 6,243,000 B1 * | 6/2001 | Tsui | 340/5.21 |
| 6,427,913 B1 | 8/2002 | Maloney | 235/383 |
| 6,481,013 B1 | 11/2002 | Dinwiddie et al. | 725/80 |
| 6,593,856 B1 | 7/2003 | Madau | |
| 2002/0014954 A1 | 2/2002 | Fitzgibbon et al. | 340/5.64 |
| 2002/0044042 A1* | 4/2002 | Christensen et al. | 340/3.54 |
| 2002/0067717 A1* | 6/2002 | Raschke et al. | 370/386 |
| 2002/0170685 A1 | 11/2002 | Weik, III et al. | 160/133 |
| 2003/0030540 A1 | 2/2003 | Hom | 340/5.22 |
| 2003/0062990 A1 | 4/2003 | Schaeffer, Jr. et al. | 340/310.01 |
| 2003/0112121 A1 | 6/2003 | Wilson | |
| 2004/0198251 A1 | 10/2004 | Fitzgibbon | 455/91 |
| 2004/0210327 A1* | 10/2004 | Robb | 700/90 |
| 2004/0239496 A1 | 12/2004 | Fitzgibbon | 340/539.1 |
| 2005/0012631 A1 | 1/2005 | Gregori et al. | 340/686.1 |
| 2005/0170777 A1* | 8/2005 | Harwood et al. | 455/41.2 |
| 2005/0184854 A1 | 8/2005 | Mullet et al. | |
| 2006/0184456 A1* | 8/2006 | de Janasz | 705/72 |
| 2007/0063815 A1* | 3/2007 | Tsui et al. | 340/5.71 |

FOREIGN PATENT DOCUMENTS

| | | |
|---|---|---|
| EP | 1 043 465 A2 | 10/2000 |
| WO | WO 03/091528 | 11/2003 |
| WO | WO 2006/053040 A1 | 5/2006 |

* cited by examiner

*Primary Examiner* — Brian A Zimmerman
*Assistant Examiner* — An T Nguyen
(74) *Attorney, Agent, or Firm* — Baker Hostetler LLP

(57) ABSTRACT

A network operator radio module (NORM) configured to be removably attached to a barrier operator comprises a transmitting antenna, a receiving antenna, a transceiver antenna, and a microcontroller. The module communicates with a communication network that comprises various nodes configured by a network controller module and a network communication module. Each node may be associated with a network appliance, and may be remotely controlled by sending a suitable function code to the module via local command signals. Furthermore, various local remote transmitters and keyless entry transmitters are configured to transmit function codes to control the module and the associated various network appliances.

11 Claims, 6 Drawing Sheets

NETWORKED MOVABLE BARRIER OPERATOR SYSTEM

CROSS-REFERENCE TO RELATED APPLICATION

The present application is a continuation-in-part of U.S. patent application Ser. No. 10/988,104, filed on Nov. 12, 2004, the specification of which is incorporated herein by reference.

TECHNICAL FIELD

The present invention is generally related to a networked movable barrier operator system that provides a network operator radio module that is adapted to be interfaced with an existing barrier operator. Particularly, the present invention is directed to a network operator radio module for a barrier operator that enables a local transmitter to control local devices. More particularly, the present invention is directed to a network operator radio module for a barrier operator that enables a local transmitter to control network devices or appliances associated with a communication network.

BACKGROUND ART

A movable barrier operator contains control electronics and an electric motor that is configured to actuate a movable access barrier between opened and closed limit positions. Such access barriers may comprise garage doors, curtains, retractable awnings, gates, and the like. Moreover, known operators are capable of receiving "local" signals and then processing requests or commands contained therein to move the barrier. Transmitted signals requesting the movement of the barrier can be delivered to the barrier operator by either hardwired signals, or from wireless signal transmissions associated with different types of transmitting devices. These devices are in the form of wired and wireless wall station transmitters, wireless transmitters, wired or wireless keyless entry transmitters, wireless vehicle mounted transmitters, and "hands-free" proximity transmitters. These known types of transmitters are collectively referred to herein as local transmitters.

Portable and/or handheld remote local transmitters comprise radio-frequency (RF) transmitters that when actuated send RF signals with embedded codes, such as function codes, to the barrier operator. The codes can either be fixed or rolling code sequences of data that uniquely identify the transmitter to the barrier operator. Rolling code sequences allow for more secure access and control of the barrier operator, since they thwart so called "sniffing" or "code grabbing" of fixed access codes.

Known prior art barrier operators have a limited capability in which to communicate their internal operating status to the outside world. For example, prior art operators typically limit their internal status reporting or feedback to local signaling via a series of light flashes, LED flashes, or audible beeps, thus requiring users to be in close proximity to the operator in order to observe the feedback. Furthermore, the feedback capacity provided by operators is limited and in most cases it is only accessible at the time the operator is encountering a problem. In-depth diagnosis or troubleshooting of problems associated with the operator using such feedback is generally inadequate. Other known prior art operators can monitor and internally store the working parameters and characteristics of the barrier creating a working "profile" of the barrier. But, current or historical profile information is not easily accessible by the user or installer.

In addition to limited outbound communications with the outside world, prior art operators also have limited receive functions. Known prior art operators contain a wired interface designed to receive a limited number of control commands. These wired interfaces are designed to operate in close proximity to the operator. Prior art operators also include wireless receivers capable of receiving short range signals from wireless transmitters. Although the wireless receiver system allows for more control command options, such as in the case of multi-function wireless wall stations, the commands are still limited in scope and are only "local" (short range).

Although the aforementioned barrier operators are effective in their stated purpose, they do not address the need to incorporate a movable barrier operator into a network system. In other words, there is a need for a movable barrier operator that serves as a conduit between a communication network and components associated with the operator. And, given the prior art limitations, a new operator control system capable of transmitting, or otherwise communicating, internal operating status to the outside world is needed. Profile information related to the movement of the barrier, if accessible, can be useful to service personnel to diagnose and correct complete system problems. Furthermore, transmitter information that is unique to each individual unit and stored inside the operator memory system can be used to identify unique users, the number of users in the system and when the user activated the operator.

Alarm signals such as for broken springs, entrapments, time for service, etc. are useful for consumers who wish to have a higher level of security and control from their operator and for service personnel diagnosing problems. Accessing this information remotely is also useful for consumers who have a need to manage and monitor the operator system from remote locations such as a second home, workplace or even via a cell phone. Remote access of operator status is also useful for service personnel who wish to diagnose operator problems before making a service call.

As previously discussed, existing barrier operators are limited to receiving short range wireless signals from various "local" transmitters so as to control functions maintained by the barrier operator. As such, the barrier operator is not configured to transmit or receive network signals for communication with various network enabled appliances or devices. Moreover, the barrier operator is unable to convert local signals that contain commands for controlling various functions maintained by the network enabled appliance or device. Without such functionality at the barrier operator, the user of the network enabled appliance is required to remotely actuate the network enabled appliances using a dedicated network transmitter that is configured to communicate with the network appliances. However, this is inconvenient to the user in that he or she is required to carry both a non-network transmitter, to control the functions of the barrier operator, and a network transmitter, to control the functions maintained by the network appliance.

Thus, there is a need for a network operator radio module that is configured to be interfaced with a compatible barrier operator, such that when interfaced, the network operator radio module enables the barrier operator to communicate with both local transmitters, network transmitters, and various appliances that are part of a network. Moreover, there is a need for a network operator radio module that is configured to convert local signals into network signals so as to allow the local transmitter to communicate and control various functions maintained by an appliance or device that is part of a communication network.

SUMMARY OF THE INVENTION

Therefore, there is a need in the art for a networked movable barrier operator system.

It is a first aspect of the present invention to provide a network barrier operator system having a barrier operator for moving an access barrier between limit positions and a network appliance, the network barrier operator system comprising a barrier operator, a network appliance, a local transmitter configured to transmit a local communication signal containing a command to control at least one function maintained by the barrier operator and at least one function maintained by the network appliance, and a network operator radio module (NORM) maintained by the barrier operator and linked to the network appliance, wherein the network operator radio module receives and converts the local communication signal transmitted by the local transmitter into a network communication signal, and transmits the network communication signal to the network appliance.

Another aspect of the present invention is a network barrier operator system comprising a barrier operator comprising a barrier controller, the barrier operator having a sleep mode and an operate mode, a network operator radio module configured to be operatively associated with the barrier operator, the network operator radio module comprising a microcontroller, a receiver, and a transceiver, wherein the receiver and the transceiver are coupled to the microcontroller, and an output of the microcontroller is coupled to the barrier controller such that when a transmitted signal is received by the network operator radio module which contains a command to be carried out by the barrier controller, the barrier operator toggles from the sleep mode to the operate mode.

Still another aspect of the present invention is a method for controlling a network appliance comprising providing a barrier operator that moves a barrier between limit positions, the barrier operator linked to a network operator radio module, receiving at least one local communication signal containing a command from a local transmitter and converting the local communication signal to a network communication signal containing the command by the network operator radio module, and transmitting the network communication signal containing the command to a communication network maintaining at least one network communication module associated with a network appliance, wherein the communication module controls the network appliance in accordance with the command.

These and other aspects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
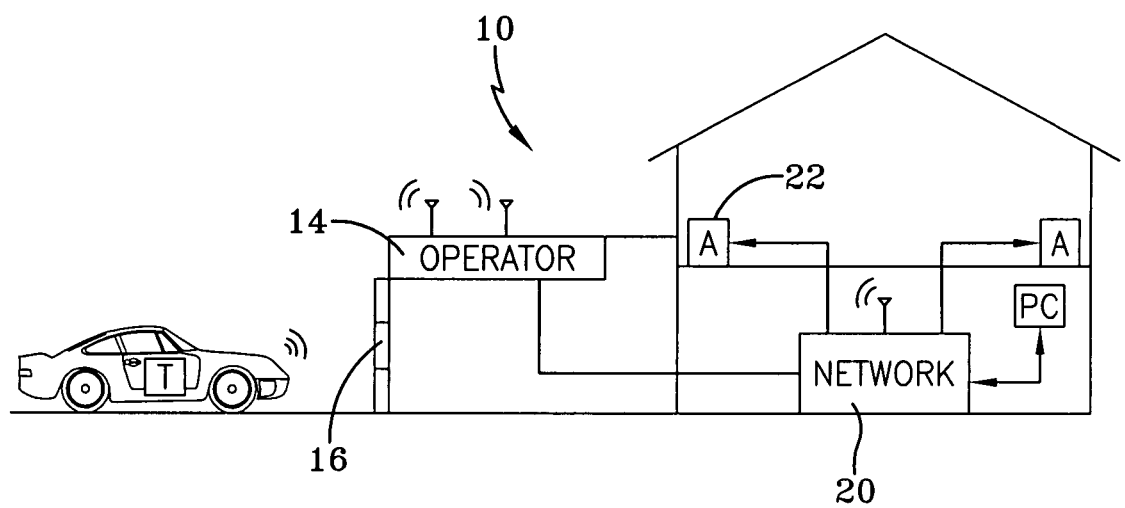
FIG. 1 is a block diagram of a home network employing a networked barrier operator system in accordance with the concepts of the present invention.

Referring now to the drawings and, in particular, to FIG. 1, it can be seen that a networked movable barrier operator system is designated generally by the numeral 10. Generally, the operator system 10 is utilized much like a movable barrier operator system, but with additional features that allow for communications to be exchanged with a network and network transmitters in addition to local transmitters. Most operator systems 10 are commonly installed in a building, such as a garage, house, factory, or warehouses, or equivalent facility or may be employed in a gated community wherein a single gate allows access to multiple users. Each operator system includes an operator controller 14 which is a microprocessor-based device that receives and generates wired or wireless signals; and includes the necessary hardware, software and memory for enabling the system. The operator controller 14 includes the ability to process "local" communication signals from transmitters and the like, and to also receive global or "network" communication signals from non-local or network devices that are part of a home, local area, wide area, cell phone or other computer-based network.

The operator controller 14 is used in conjunction with a barrier 16 which may be of most any type. The barrier 16 is typically a garage door, but it will be appreciated that the disclosed system may also be used with curtains, retractable awnings, gates and any other type of barriers that move between known limit positions. Accordingly, a local or network device may generate a local communication signal that is received by the operator controller 14 so as to initiate the movement of the barrier 16 in a desired direction. The operator system 10 may include a network 20 which may be associated with the structure that contains the movable barrier, although it will be appreciated that the network 20 may be physically removed from the operator system 10. In any event, the network 20 is typically associated with appliances 22, which may include but is not limited to entertainment systems, refrigerators, scales, plumbing fixtures, air conditioners, furnaces, lights, personal computers, peripheral devices, and the like. The network 20 may utilize either wired or wireless communication protocols, or a combination of both to allow the networked appliances 22 to communicate with the network 20. Moreover, the network 20 may be linked through wired or wireless connections to other networks contained within a community or within the facility. Control of the network 20 may be implemented by a personal computer, designated as PC in FIG. 1, a personal digital assistant, or any other processor-based communication device.

Figure 2:
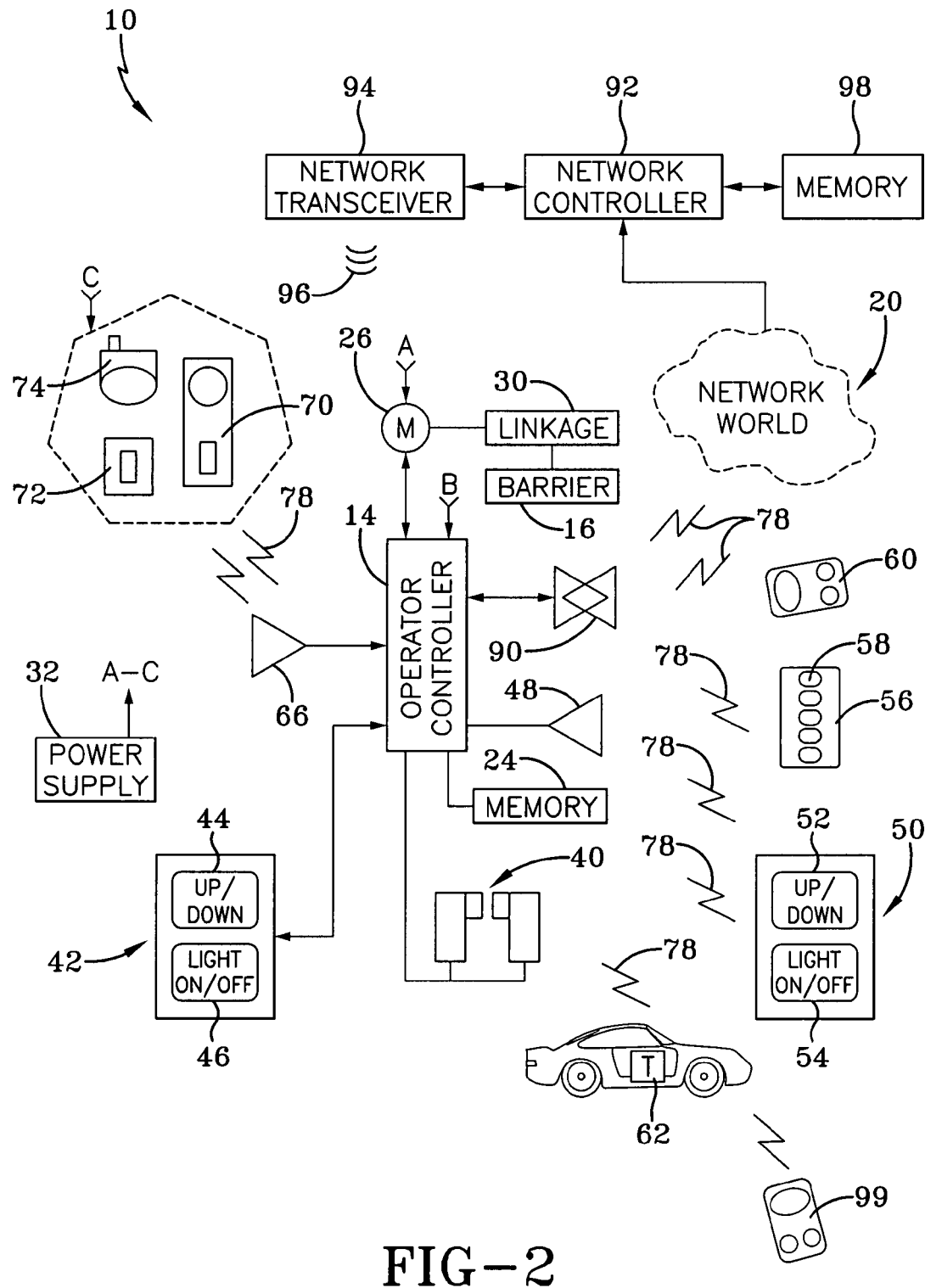
FIG. 2 is a block diagram of the networked barrier operator system in accordance with the concepts of the present invention.

As best seen in FIG. 2, the operator system 10 includes the operator controller 14, which is connected to a non-volatile memory device 24 that stores identifying codes. Additionally, identifying codes are contained within the various communication signals exchanged between the operator controller 14 and various other communication devices, thus allowing each transmitter to be identified, so that the operator controller 14 can determine whether the transmitter is an approved device or not. In other words, the controller 14 compares each identifying code received, with identifying codes stored in the memory 24 to determine whether the operator controller should take further action. Also connected to the controller 14 is a motor 26 which may be an AC (alternating current) or DC (direct current) device that allows for sufficient generation of power to move the barrier 16 in a safe and efficient manner between limit positions. The motor 26 drives linkage 30, which is operatively associated with the barrier 16. The linkage 30 functions to convert the mechanical power generated by the motor 26 in such a way as to move the barrier 16 between opened and closed limit positions. The linkage 30 may comprise a counter-balance system that may be header-mounted, or ceiling-mounted, for example. In addition, the counter-balance system may comprise a trolley based system or any other configuration needed to implement movement of the barrier 16 from one position to another. A power supply 32 is included in the system 10 and supplies power to the motor 26 via a power input, designated A, and to the controller 14 via power input, designated B, as well as to any other component contained within the system 10 as needed. It will be appreciated that the power supply 32 may comprise a residential or industrial power source, including 120 VAC mains power, that is stepped up or down, or conditioned as needed by the specific component. The power supply 32 may also include any back-up power supplies, such as batteries and the like to ensure continuous operation of the system 10.

A plurality of local or non-network transmitters, or devices may be connected to or associated with the operator controller 14, such that the transmitters/devices communicate with the operator controller 14 via wired or wireless communication signals. The local transmitters or devices are learned or programmed for use with the operator controller 14 by actuation of a learn button associated with the operator controller 14, and actuation of a single or multiple buttons associated with each transmitter or device. However, the foregoing learning steps may be reversed. In any event, one of the local devices may be a safety sensor 40, such as a photo-electric eye, an astragal sensor, or other device which detects obstructions in the path of the barrier 16 as it moves between limit positions. If an obstruction is detected by the safety sensor 40, this information is communicated to the operator controller 14 so that it may take the appropriate corrective action. Another local device may be a wired wall station 42 which is typically positioned near an interior access door associated with the area enclosed by the movable barrier 16. A typical wall station 42 includes an up-down switch 44 and a light on/off switch 46. It will be appreciated that other buttons may be associated with the wall station 42, such as for adjusting door height to allow ingress and egress of pets, to actuate various learning or operational modes of the controller 14 and the like.

A wireless receiver 48 may be connected to the controller 14 for the purpose of receiving radio frequency (RF) signals. Of course, other wireless signals, such as acoustic or infrared could be used with an appropriately configured receiver. The wireless receiver 48 usually receives one type or format of frequency signal, but it will be appreciated that multiple frequency signals or different frequency signals may be received and then processed by the controller 14. The wireless receiver 48 receives signals from non-network or local devices, such as a wireless wall station 50, which functions in much the same manner as the wired wall station 42. Indeed, the wall station transmitter 50 includes an up/down switch 52 and a light on/off switch 54. Accordingly, when any one of these switches associated with the wall station transmitter 50 are actuated, the transmitter 50 generates a wireless signal at a pre-designated frequency that is transmitted by the receiver 48. Another type of local wireless device is a keyless entry transmitter 56, which allows for a user to enter a personal identification number (PIN) so as to allow access to the area controlled by the barrier 16. The keyless entry transmitter 56 includes a plurality of buttons 58 that when actuated in a pre-designated sequence allows for opening and closing of the access barrier 16 via the operator controller 14.

A local remote transmitter 60 is another non-network or local device that may be associated with the operator controller 14. The local remote transmitter 60, which may be referred to as portable or a handheld remote, is typically carried in an automobile or other vehicle. Actuation of any one of the buttons on the remote transmitter 60 generates a signal that is received by the receiver 48 and then processed by the operator controller 14, so as to move the barrier 16 or perform other functions enabled by the controller 14. Yet another type of local transmitter is a vehicle-mounted transmitter 62 that may be installed in a car. Such a vehicle mounted transmitter may comprise a Home Link™ device or a hands-free transmitter that sends signals to the receiver 48 depending upon the proximity or position of the transmitter 60 with respect to the controller 14. Upon confirmation of the transmitter's position, the controller 14 may initiate movement of the barrier 16 depending upon the status of the barrier 16 and the direction of its movement.

In addition to the local wireless devices discussed above, other non-network or local devices may include accessory devices, which are also enabled and controlled by the controller 14. Moreover, it should be appreciated that upon receipt of a local communication signal 78 from any one of the previously mentioned non-network or local devices, the operator controller 14 may generate a local communication signal 78 that is transmitted by a controller transmitter 66 and then received by accessories such as a door lock 70, a light switch 72 or a light kit 74. Thus, the operator controller is able to receive and transmit local communication signals 78 as needed to carry out the functions maintained by the system 10. For example, one of the buttons on the remote transmitter 60 may be associated with control of the door lock 70. Accordingly, actuation of the button generates a suitable local communication signal 78 received by the receiver 48 associated with the operator controller 14. After the local communication signal 78 is received, it is processed by the controller 14 and, if authenticated, a corresponding local communication signal 78 is generated by the transmitter 66 for receipt by the lock 70, enabling the lock to move between locked and unlocked positions. In much the same manner, the light switch 72 may be turned on and off to control the illumination of the light kit 74. It should also appreciated that the accessories 70, 72, and 74 may be powered by the power input, designated C, via the power supply 32 and each of the accessories 70-74 have the appropriate receiver and controller so as to enable operation thereof.

As previously discussed, each of the local or non-network devices are able to send local communication signals to the controller 14 by either a wired or wireless signal. Upon receipt of this local communication signal, the controller 14 determines whether the signal is appropriate and valid and then performs the associated function. To accomplish this, each local communication signal includes an identification code or related code within a stream of data that may or may not be encrypted, and which the controller 14 routes and performs the function associated therewith. If the code cannot be identified it has not yet been learned by the controller 14, and the controller 14 takes no action and may return an invalid signal to the emitting device.

An operator/network transceiver 90 is also operatively associated with the controller 14 for the purpose of communicating network communication signals 96 between the operator controller 14 and various network transmitters and network devices and, if desired, the network 20. The network communication signals 96 may be wireless or wired in either a unidirectional or bidirectional format. In other words, the operator/network transceiver 90 may be connected to the controller 14 and to other various network devices in either a wired or wireless configuration. As previously discussed, the network world 20 contains peripherals, and other network points of access, such as internet portals and/or personal computers to allow for communication with the operator controller 14 via the network 20. One or more of the devices contained within the network world 20 may employ a network controller 92. As such, network communication signals 96 generated by the operator controller 14 and transmitted by the network transceiver 90 may be received by a network transceiver 94 which is connected to the network controller 92. The network communication signals 96 may then be transferred to the network controller 92, which in turn directs the network communication signal 96 to the appropriate appliance, peripheral or computer, or other device associated with the network 20. If needed, the network controller 92 may access a network memory device 98 to confirm or validate any code contained within a received network communication signal 96.

Alternately, the network 20 may communicate with the operator controller 14 by first sending an appropriate network communication signal 96 to the network controller 92, which utilizes the network transceiver 94 to communicate the signal to the operator/network transceiver 90. The data contained within the communication signal 96 is then relayed to the operator controller 14, which in turn sends an appropriate signal to the designated local device that is associated with the controller 14. Thus, any network device in the network 20 may send a network communication signal 96 containing a function to be invoked at various non-network or local devices via the controller 14. For example, a user utilizing a network device that is part of the network 20, such as an internet portal, can send an instruction via a website to the network controller 92, so as to actuate a local device, such as the lock 70 in the non-network or local world. Thus, users of the system 10 can send network communication signals 96 from network devices associated with the network 20 to the operator controller 14, so as to control various local devices, and appliances. Furthermore, a user can send local communication signals from various local devices via the operator controller 14 to the network world 20 so as to control the function of one or more network devices.

In particular, a network device 99 may comprise a wireless remote transmitter that communicates with the operator controller 14 via the network transceiver 90. It will be appreciated that all the different types of "local" devices that communicate with the controller 14, via either wired connections, or the transmitter 66 and the receiver 48, may instead be configured as network devices that reside in or are otherwise associated with the network 20 and communicate via the transceiver 90 with the controller 14. Networked devices may behave in many cases like "local" devices; however, networked devices are not constrained by short communication linkages as in the case of local devices. Networked devices are capable of sending signals to each other directly and, as in the case of "mesh" type networks, may use each other as relay points to send signals from device to device. Networked devices are able to function in the network without the need for a secondary device to "bridge" command signals between devices. In the case of the local light switch 72, the operator controller 14 is needed to bridge the signal between it and the local wall station 50. In other words, local wall station 50 is not capable of communicating with local light switch 72 if the operator controller 14 is removed. However, in the case of a network configuration, a networked device 99 is capable of communicating directly with any devices within the network world 20 without the aid of an intermediate device.

Figure 3:
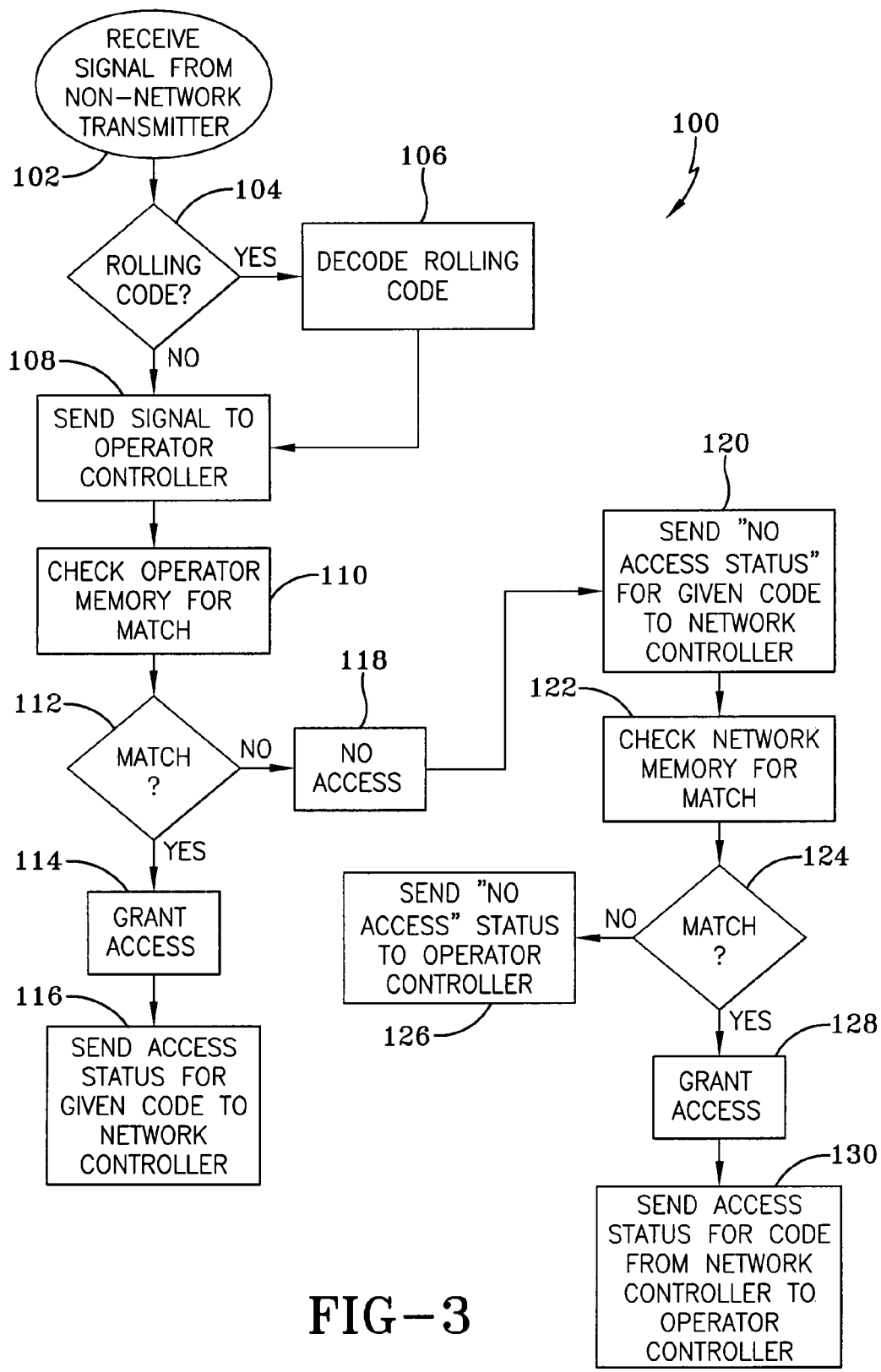
FIG. 3 is an operational flow chart illustrating the steps implemented in processing signals by an operator controller and a network controller used in the operator system.

Referring now to FIG. 3, it can be seen that an operational flow chart is designated generally by the numeral 100 for the purpose of processing signals sent from a non-network or local transmitter. At a first step 102, an operational signal is received by the operator controller 14 from a non-network or local transmitter. Such a non-network transmitter may include transmitter devices 42, 50, 56, 60, 62 or other non-network device such as a safety sensor 40. At step 104, the operator controller 14 inquires as to whether the operational signal received contains a rolling code or not. A rolling code changes upon each transmission and such a change in the transmission is anticipated by the operator controller 14 so as to confirm the validity of the communication signal. In any event, if a rolling code is detected at step 104, the rolling code is decoded at step 106. If a rolling code is not detected, or the rolling code has been decoded, as at step 106, then at step 108 the signal is sent to the operator controller 14. Upon receipt of the signal, the operator controller 14 checks the internal memory 24 to determine whether the identifying code contained within the operational signal is matched or not. At step 112, the controller determines whether a match has been found and if so, then at step 114, access is granted and the requested operation is performed by the controller 14. Following this, at step 116, the access status for the given operational signal is sent to the network 20 where a device such as the controller 92 can use the information for logging and other evaluation purposes.

Returning to step 112, if an operational signal does not contain a code that is matched at step 112, then no access is permitted as indicated at step 118. Next, at step 120, the operator controller 14 sends a "no-access" status for the given code to the network 20 where a device such as controller 92 resides. The network controller 92, at step 122, then checks network memory 98 to determine if the code received is acceptable or not. Accordingly, if at step 124 no match is found, then the process continues to step 126, where a "no access" status is returned to the operator controller 14 and no action is taken. Alternatively, some type of invalid or error signal may be returned to the original transmitting network device. However, if at step 124 a match is found in the queried memory device, then the process continues to step 128 where access is granted and the requested function is performed. Next, at step 130, an access status signal is sent for the code from the operator controller 14 to the network where a device such as controller 92 can use the information for logging and other evaluation purposes. In this manner, a network transmitter or device is usable with the operator controller 14. As such, network devices or transmitters can be used to allow for any number of non-network or network functions to be implemented. If a network-type transmitter 99 is actuated in range of the operator controller 14, then that function is screened by the operator controller 14 to determine whether it is an approved device and, if not, then the operator controller 14 communicates with the network world 20 to determine whether the device is approved for use with the controller 14. If so, then the action is implemented. If not, a return signal may be sent to the network transmitter 99. It will also be appreciated that control of the access barrier 16 or the non-network or local components may be initiated directly from the network world 20 by the network controller 92 in an appropriate manner. And, operational and status information regarding operation of the linkage 30, the motor 26, and any observable phenomenon associated therewith can be collected by the network 20.

Figure 4:
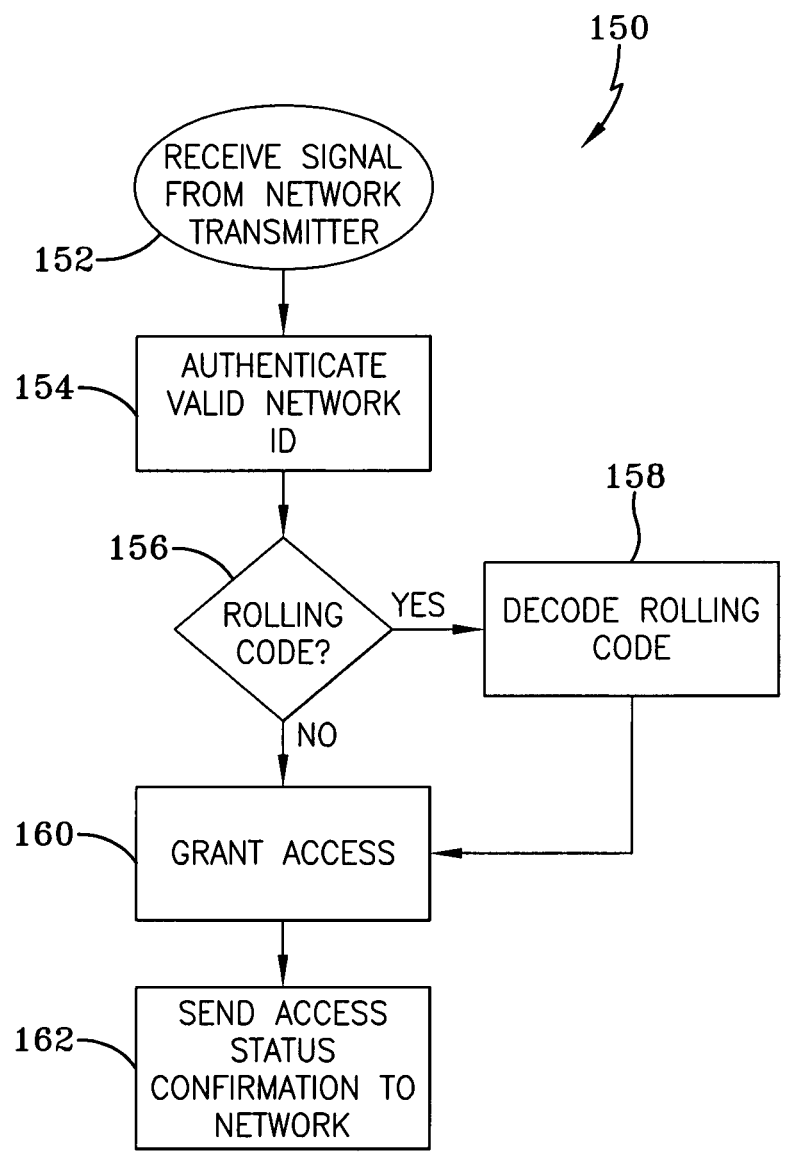
FIG. 4 is an operational flow chart illustrating the steps implemented in authenticating signals received by the operator controller.

Referring now to FIG. 4, it can be seen that an operational flow chart is designated generally by the numeral 150 for the purpose of processing network communication signals from a network transmitter or device. If a network communication signal is received from a network device or transmitter associated with the network 20, then the communication signal is received by the network transceiver 90 at step 152. This transmission is authenticated as a valid network identification code at step 154. Next, at step 156, it is determined whether the signal is in a rolling code format or not. If a rolling code is used, then it is decoded at step 158. However, after the rolling code has been decoded or if a rolling code has not been detected then the device is granted access and the desired function is implemented, as indicated at step 160. Following this, at step 162, an access status confirmation is sent to the network 20 where a device such as controller 92 can use the information for logging and other evaluation purposes.

Figure 5:
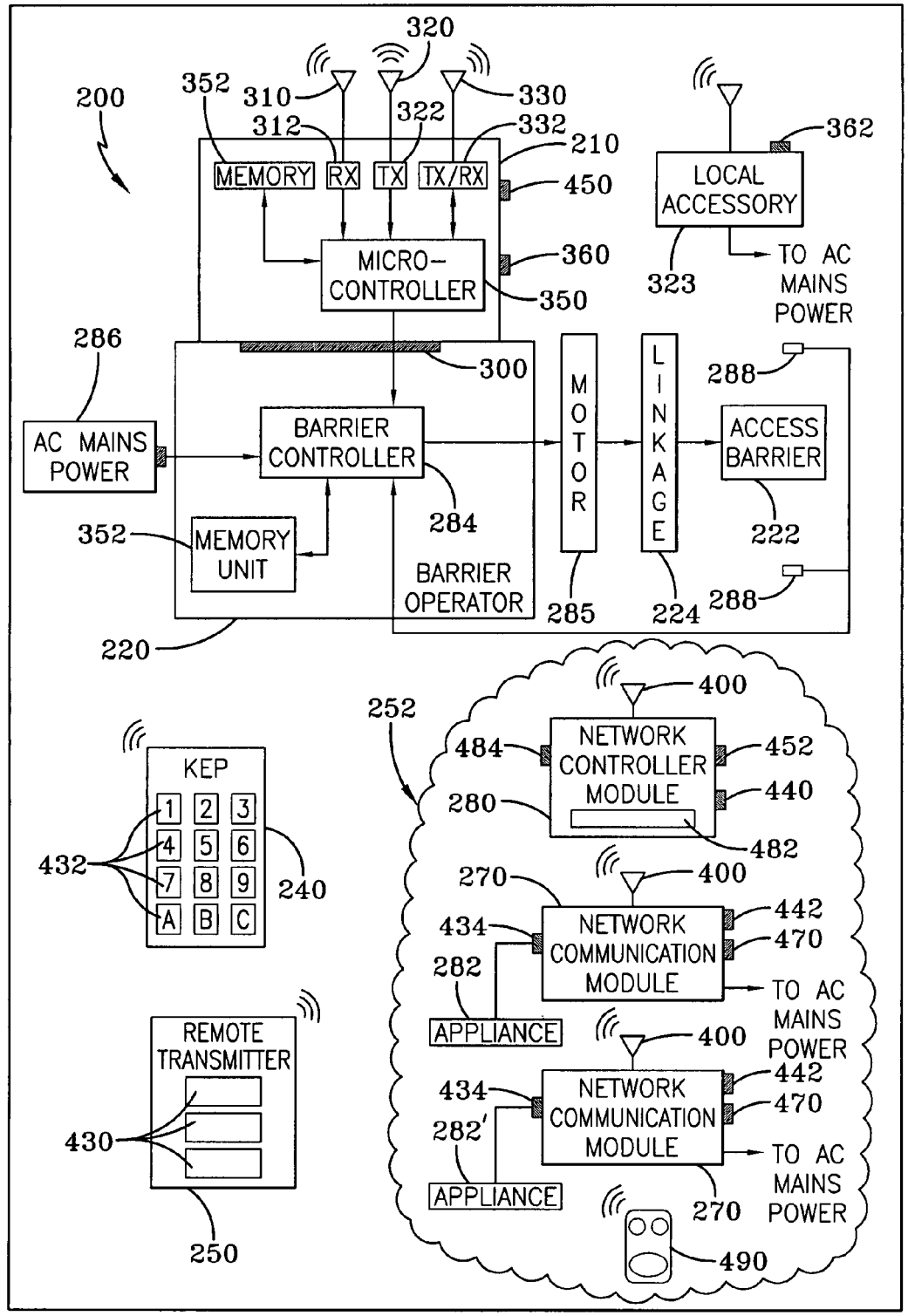
FIG. 5 is a block diagram showing an alternative embodiment of the present invention, which includes a network operator radio module (NORM) that enables the barrier operator to communicate with a plurality of local transmitters, local accessories, and network appliances in accordance with the concepts of the present invention.

In another embodiment of the present invention, a network operator system is generally referred to by the numeral 200, as shown in FIG. 5 of the drawings. The network operator system 200 includes a network operator radio module (NORM) 210 that is interfaced with a compatible barrier operator 220. The barrier operator 220 is configured to actuate a movable access barrier 222, such as a garage door, between opened and closed limit positions via suitable linkage 224. It should be appreciated that the movable access barrier 222 may comprise any gate, garage door, retractable awning, curtains, and the like for the purpose of opening and closing the barrier. A keyless entry programmable transmitter 240 and a remote transmitter 250 are provided to transmit various commands via various local communication signals to the NORM 210. Such communication signals are referred to as "local" because the keyless entry transmitter 240 and the remote transmitter 250 are only enabled to communicate with the NORM 210, and are unable to communicate directly with the various appliances maintained by a communication network discussed below. Upon receipt of the local communication signals by the NORM 210, they are converted into compatible network communication signals. Once converted, the NORM 210 retransmits the network communication signals to a communication network 252 comprised of one or more network communication modules 270. The network communication modules 270 are configured by a network controller module 280 to serve as communication nodes, so as to control various functions associated with various network appliances 282. As used herein, a network appliance is any electrically or mechanically operated device that can receive input and/or generate output to enable and/or facilitate control of the appliance, and wherein the network appliance may be used to generate output that controls other network appliances. In other words, the nodes and specifically the network communication modules 270 are receptive to the commands contained in the network communication signals sent by the NORM 210 and control the network appliance 282 accordingly. Thus, by interfacing the NORM 210 with the barrier operator 220, a user is able to control the operation of various network appliances 282 using the local transmitters 240,250, without the need of a separate network enabled transmitter.

Prior to discussing the specific aspects of the NORM 210 and its relationship with the barrier operator 220 and the communications network 252, it should be appreciated that the terms "local communication signal" and "network communication signal," as used in the discussion below, refer to signals that may be either transmitted or received by the various components discussed herein. Continuing, the barrier operator 220 that is configured for use with the NORM 210 maintains a barrier controller 284, which maintains the necessary hardware, software, and memory to carry out the various functions to be described. The barrier controller 284 is coupled to a motor 285 that is configured to move the access barrier 222 via the linkage 224 between opened and closed limit positions, in accordance with a command signal sent from the local transmitters 240,250. Moreover, the barrier operator 220 is powered by standard commercial AC power, such as 120 VAC mains power, delivered by a mains power supply 286. Of course, DC power supplies could also be used to power the operator 220. The barrier operator 220 also maintains a communication interface 300 that enables the NORM 210 to be selectively coupled or interfaced to the barrier operator 220, so as to enable the various functions of the NORM 210 to be incorporated. Finally, to enhance the safety of the barrier operator 220, a pair of photo beams 288 may be provided to detect the presence of any obstacles in the path of the access barrier's movement. Should an obstacle be detected, the barrier operator 220 may take corrective action, such as stopping and reversing the movement of the access barrier 222.

The NORM 210 is configured to be removably attached to the compatible barrier operator 220 via a communication interface 300. As such, the barrier operator 220 may be upgraded at a later time with the functionality provided by the NORM 210. In addition, to being configured as a modular unit that can be selectively interfaced with an existing barrier operator, the circuitry of the NORM module 210 may be directly integrated into the circuitry of the barrier operator 220. Further, the NORM 210 includes a plurality of antennas that enable it to transmit and receive various remote communication signals, including local and network communication signals of various frequencies and signal/data protocols. Specifically, the NORM 210 includes a receiver antenna 310 that is associated with a suitable receiver circuit 312 to receive various local communication signals sent from the local keyless entry transmitter 240 and the remote transmitter 250 and other local devices that are configured to communicate with the barrier operator 220. It should be appreciated that the receiver antenna 310 and the receiver circuit 312 may be configured to receive local communication signals having a carrier frequency of approximately 372 MHz, for example. Moreover, transmitted local communication signals may utilize a rolling code, such as the rolling code provided by KEELOQ®, to authenticate that the received local communication signal has been sent from an authorized transmitter 240,250 which has been previously learned with the barrier operator 220. In one aspect, the receiver antenna 310 may be configured as a wired antenna. In addition, the NORM 210 may include an accessory antenna 320 that is associated with a suitable transmitter circuit 322 so as to transmit an accessory signal to control a local accessory 323, such as a remotely located light for example. It should be appreciated that the accessory antenna 320 and the transmitter circuit 322 may be configured to transmit an accessory signal that has a carrier frequency of approximately 433 MHz, for example or any frequency different than utilized by the receiver circuit 312. The accessory antenna 320 may be configured as a printed circuit board (PCB) loop antenna that is integrated into the circuitry comprising the NORM 210. Furthermore, the NORM 210 includes a network antenna 330 that is associated with a transceiver circuit 332 that enables the NORM 210 to communicate various network communication signals with the network communication modules 270 maintained by way of the communication network 252 in a manner to be discussed. It should also be appreciated that network communication signals comprise signals that may utilize a 908 MHz carrier frequency, for example or any frequencies different from that used by the receiver circuit 312 and/or the transmitter circuit 322. While various examples of carrier frequencies associated with the local communication signal, the network communication signal, and the accessory signal have been discussed, such should not be construed as limiting, as other carrier frequencies may be utilized.

Coupled to the receiver 312, the transmitter 322, and the transceiver 332 of the NORM 210 is a microcontroller 350. The microcontroller 350 comprises the necessary hardware, software, and memory to carry out the various functions provided by the NORM 210 to be discussed in detail below. In particular, the primary function of the microcontroller 350 is to identify the requested command within the local communication signal sent by the local transmitter 240,250 and then forward the command to the communication network 252 via a network communication signal. As such, the microcontroller 350 is configured to convert transmitted local signals having a particular carrier frequency and protocol into network signals having another carrier frequency and/or protocol and vise versa, so as to enable control of both local accessories 323 and network appliances 282. In addition, the NORM 210 may also include a memory unit 352 that may be coupled to the microcontroller 350 so as to provide various data storage functionality, which allows additional local transmitters 240,250 to be learned with the barrier operator 220.

Before discussing the network appliances 282 provided by the communication network 252 and their operation, various local accessories 323 may be associated with the NORM 210. To associate the local accessory 323 with the NORM 210, the user may actuate a learn button 360 maintained by the NORM 210, and a learn button 362 maintained by the local accessory 323. Once the local accessory 323 and the NORM 210 have been learned with each other, the keyless entry transmitter 240 and/or the remote transmitter 250 may control the operation of the local accessory 323 by sending a local communication signal containing a command associated with the desired operation to be carried out by the NORM 210. Because the local accessory 323 is learned directly with the NORM 210, commands or function codes are sent directly to the accessory 323 via the accessory antenna 320 of the NORM 210, independently of the communication network 252. One example of a suitable local accessory 323 is a light that may be remotely turned off and on by actuating a suitable function button 430 at the remote transmitter 250 or entering a suitable PIN code entered via an alphanumeric keypad 432 of the respective keyless entry transmitter 240.

The communication network 252 comprises various network communication modules 270, and network controller modules 280 each of which include an antenna 400, a transceiver (not shown), and suitable control logic components to carry out the functions to be described. Specifically, the communication module 270 includes a power control interface 434 that is configured to be coupled to the power input of various appliances 282 for which remote control via the communication network 252 is desired. For example, the power interface 434 may comprise a standard electrical receptacle that is configured to receive a compatible plug from the appliances 282. In addition, the controller module 280 may be powered by a portable power source, such as a battery, while the communication module may be powered by a mains power source, such as 120 VAC for example.

Each communication module 270 forms individual communication nodes based on a mesh network communication topology that comprises the communication network 252. For example, the network controller module 280 and the communication modules 270 may utilize mesh network signal protocols provided by products under the trademarks Z-Wave®, Zigbee®, or Bluetooth®, for example. As such, the communication protocol utilized by the mesh network 252 establishes that the network controller module 280 is configured as a master, while each of the network communication modules 270 serves as a slave. Thus, the communication network 252 allows the communication modules 270 to receive various network communication signals sent from the network antenna 330 of the NORM 210, and to transmit various network communication signals to the NORM 210, as well as to other network communication modules 270. Moreover, the mesh network 252 is configured to dynamically forward network signals between each node until they reach their intended network communication module 270. Once the network signal reaches its intended node in the communication network 252, or reaches the NORM 210, the command or function code contained therein is processed and carried out by the associated appliance 282, barrier operator 220, or local accessory 323. In other words, if one node becomes disabled, the other nodes may re-route the network signal around the disabled node so that the network signal reaches its intended destination node.

In order to create functional nodes within the communication network 252, the controller module 280 is enabled and learned with each of the network communication modules 270. The learning of the communication module 270 with the controller module 280 and the NORM 210 allows the controller module 280 to generate a routing table that identifies the particular location of each individual communication module 270 with respect to other communication modules 270, so that various network signals can be transmitted between each node of the communication network 252. To allow the controller module 280 to be learned with the various communication modules 270, the communication modules 270 are coupled via their power interface 434 to the power input, such as an electrical plug, of a given appliance 282 of which control is desired. It should be appreciated that the appliances 282 may include, for example, a light, or series of lights, a television, HVAC units, a radio, a coffee maker, thermostat, or any other appliance in which the user desires remote control thereof. Once the communication modules 270 have been associated with the various appliances 282, and arranged in the desired manner throughout a given area to establish the topology of the communication network 252, the network controller module 280 is learned with each of the communication modules 270. This may be done by depressing a learn button 440 on the network controller module 280 and somewhat simultaneously a learn button 442 on each of the network communication module 270. After each of the communication modules 270 are learned with the network controller module 280, the network controller module 280 develops and maintains the routing table that establishes the communication relationship between each of the communication modules 270 based upon their relative location throughout the network 252. As such, the routing table establishes the most efficient and reliable communication links or paths for which to send various network communication signals between each of the nodes. Additionally, the routing table allows the communication network 252 to dynamically route network signals around inactive nodes or dead spots where network communication is inhibited, thus facilitating the reliable communication of network signals into and out of the network. Thus, when the mesh network 252 is implemented within the context of a home, for example, the routing table identifies the various communication nodes created based on the relative location of the appliances 282 to be controlled. Should a communication module 270 fail for any reason, the transmitting node re-routes the communication signal to the next best node in communication range, so that the communicated network signal reaches its intended destination node so that control of the associated appliance 282 is achieved. Moreover, the nodes or communication modules 270 that do not originate a network signal or are not the intended recipient of a network communication signal, serve as repeater nodes that forward the received network signal to the next node based upon the routing table maintained by the controller module 280.

Once the communication modules 270 and the controller module 280 have been learned to each other, the routing table maintained by the network controller module 280 is replicated, or otherwise copied to the memory unit 352 maintained by the NORM 210. This may be accomplished by depressing a replicate button 450 maintained by the NORM 210, and a replicate button 452 maintained by the network controller module 280. Once the routing table defining the nodes of the communication network 252 is stored in the NORM 210, the network operator system 200 can communicate with the local transmitters 240, 250. As such, the keyless entry programmable transmitter 240 and the remote transmitter 250 may be enabled to selectively transmit various commands via local communication signals to the NORM 210, which are then translated by the NORM 210. The commands are then processed by the NORM 210 to control functions at the barrier operator 220, functions maintained by the local accessory 323, or functions maintained by the network appliance 282. This may be accomplished by actuating the learn button 360 maintained by the NORM 210 and initiating a learn mode maintained by the keyless entry transmitter 240 and the remote transmitter 250. Once the keyless entry programmable transmitter 240 and/or the remote transmitter 250 have been learned with the NORM 210, the user may control the various network appliances 282 coupled to the network communication modules 270 that have also been learned with the NORM 210.

To invoke functions at the barrier operator 220, the local accessory 323 and at the network appliances 282, either of the local transmitters 240,250 may be utilized. Specifically, the keyless entry programmable remote 240 comprises the alphanumeric keypad 432 that allows a user to enter various PIN (personal identification number) codes or any other numeric or alphanumeric code that may be associated with various functions maintained by the barrier operator 220, the local accessory 323, or the communication module 270. As such, the input of the appropriate PIN code at the keypad 420 results in the appropriate command being transmitted via a local signal to the NORM 210 where it is processed and forwarded either to the barrier controller 284, the local accessory 323, or to the network communication module 270 depending on the component to be controlled by the command. In addition to the keyless entry remote 240, the remote transmitter 250 includes a plurality of function buttons 430 that invoke various functions by communicating commands to the barrier operator 220, the local accessory 323, or the network communication module 270 via the NORM 210. Thus, the input of a PIN code via the keypad 470 of the keyless entry remote 240 or the actuation of a function button 480 of the remote transmitter 250 results in the transmission of a local communication signal carrying a command associated with a function to be performed being transmitted to the NORM 210.

Once a local communication signal sent from the local transmitters 240, 250 is received by the receiver antenna 310, the NORM 210 analyzes the command or function code contained within the local communication signal, and determines whether the requested function is to be carried out by the barrier operator 220, the local accessory 323 or by the network appliance 282. If the requested function is to be carried out by the barrier operator 220, the NORM 210 directly forwards the function code via the interface 300 to the barrier controller 284, which carries out the function. For example, if the function code is associated with moving the access barrier 222 into an opened position, then the NORM module 210 forwards the function code to the barrier operator 222, where the function is carried out. However, if the requested function is to be carried out by the local accessory 323, then the NORM 210 forwards the command or function code via an accessory signal, to the local accessory 323 via the transmitter antenna 320. Finally, if the requested function is to be carried out by a network appliance 282, the NORM 210 generates a network communication signal using mesh protocol to transmit the function code to one of the network communication modules 270 maintained by the communication network 252. Once received by one network communication module 270, the function code is forwarded between the nodes of the mesh network to the specific communication module 270 associated with the appliance 282 to be controlled by the transmitted signal. For example, an air conditioner may be configured as a network appliance 282 by coupling it to the network communication module 270 in the manner previously discussed. Thus, by actuating an associated function button maintained by the transmitters 240,250, a command associated with the function to be carried out is sent from the NORM 210 to the communication network 252, where it is routed to the particular communication module 270 associated with the air conditioner appliance 282. Once received by the intended communication module 270, the requested command is carried out. If appropriate, confirmation or status signals of the appliance may be distributed throughout the network.

It should also be appreciated that the NORM 210 may maintain a solicited and an unsolicited mode that may be invoked by depressing a combination of the learn button 360 and the replicate button 450. However, prior to discussing the various modes maintained by the NORM 210, it should be appreciated that the network controller module 280 may include a display 482, such as a liquid crystal display (LCD), that is configured to display the transmitted status information relating to the various network appliances 282, local accessories 323, and the barrier operator 220 in a manner to be discussed. Thus, in the unsolicited mode, the NORM 210 is configured to generate and transmit various data and/or various control signals to the communication network 252 in order to provide status information regarding the state of the barrier operator 220. Specifically, when configured as an unsolicited system, the NORM 210 automatically transmits a network communication signal containing status data after each function invoked by the local transmitters 240,250 has been carried out by the barrier operator 220. For example, after the barrier operator 220 actuates the access barrier 222 in accordance with the local command signal sent from the remote transmitter 250, the NORM 210 transmits a network signal containing the status of the access barrier 222 to the network controller module 280. Once the status data is received by the controller module 280, the status of the access barrier 222 is presented on the display 482 so that it can be viewed by the user of the system 200. In one aspect, status information may include the position of the access barrier 222 (i.e. open, closed, intermediate), and whether an obstacle has been detected by the photo beams 288. In addition, status information may also be transmitted automatically by the NORM 210 after each transmitter 240,250 initiated operation carried out by the local accessory 323. For example, if the local accessory 323 comprises a light, the NORM 210 may automatically transmit the status, indicating whether the accessory 323 is turned ON, or turned OFF, for example. In other words, the NORM 210 transmits status information to the network controller module 280 indicating the status of the access barrier 222, and local accessory 323 after each function performed thereby.

In addition to the unsolicited mode, the NORM 210 may also operate in a solicited mode that may be invoked by depressing a combination of the learn button 360 and the replicate button 450. Once placed in the solicited mode, the NORM 210 only transmits status data to the network controller module 280 when a request for status data is received via a network signal sent by the network controller module 280. To generate such a status request, the controller module 280 may provide a status button 484 that allows the user to invoke a request for status data regarding the access barrier 222 and/or the local accessory 323. For example, if the user actuates the status button 484, a status request function is sent to the NORM 210 via a network signal. The NORM 210 then retrieves the relevant status, such as if the access barrier 222 is closed and/or the local accessory is turned ON, and then transmits the status information via a network signal to the communication network 252 for receipt by the network controller module 280. Once received, the network controller module 280 then displays the particular status of the access barrier 222 and/or local accessory 323. It should be appreciated that in the unsolicited mode, the NORM 210 only transmits the status information in response to a request from the network controller module 280. This is in contrast to the solicited mode, whereby the NORM 210 transmits status information to the communication network 252 every time a function is carried out by the barrier operator 220 or the local accessory 323.

In one aspect of the system 200, the network communication modules 270 may be configured to receive a scene function code sent from one of the various local transmitters 240,250. A scene is configured by utilizing multiple communication modules 270 and appliances 382 comprised of lights, whereby they are arranged so as to be controlled by a function maintained by the local transmitters 240, 250, and by setting the desired lighting intensity at each communication module 270 associated with each light appliance 282 that is to be part of the scene. For example, the light intensity of each light may take on any illumination or intensity level between off and bright. To accomplish this, the learn button 442 of the communication modules 270 may serve as a dimmer or potentiometer, and may be depressed until the desired light intensity is achieved. Once the intensity is set for each light based appliance 282 in the scene, each of the associated communication modules 270 are learned with the NORM 210. Thus, when a button or code associated with the particular scene is selected at the transmitter 240,250, each of the light based appliances 282 are illuminated in the configured manner so as to create a "scene."

It should also be appreciated that a network transmitter 490 may be utilized by the network operator system 200. The network transmitter 490 is configured to communicate network signals via the communication network 252 to the NORM 210, so as to remotely control one or more local accessories 323 or network appliances 282. For example, the network transmitter 490 may be used to turn ON, turn OFF, or to dim the light that is configured as the local accessory 323.

Figure 6:
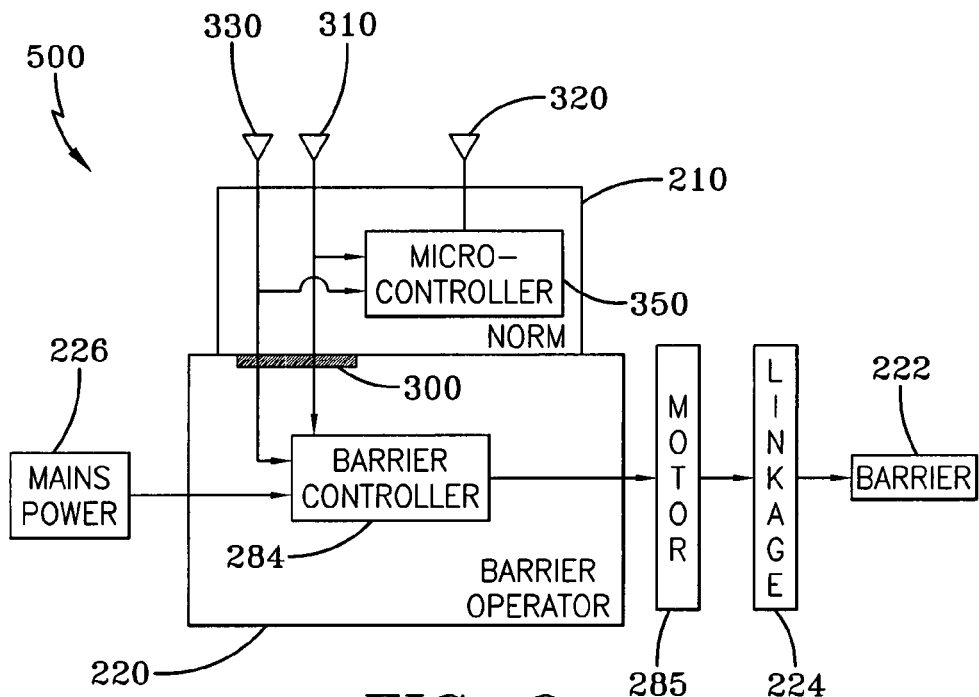
FIG. 6 is a block diagram of another embodiment of the network operator radio module (NORM), whereby communication signals sent to the barrier operator are simultaneously received by the NORM module and the barrier operator in accordance with the concepts of the present invention.

In one embodiment of the network operator system referred to by the numeral 500, as shown in FIG. 6, the system is configured such that the local communication signals and network communication signals received by the receiver antenna 310 and transceiver antenna 330 respectively are coupled to the microprocessor 350 of the NORM 210 and directly to the receiver circuitry maintained by the barrier controller 284 of the barrier operator 220. As such, the microcontroller 350 and the barrier controller 284 simultaneously receive the local communication signal and network communication signal that may be sent from the keyless entry remote 240 and the remote control 250, the network communication module 270, and the network controller module 280. Such a configuration allows for enhanced operation as the microcontroller 350 of the NORM 210 and the barrier controller 284 receive the same information, each device can ignore commands intended for the other. Such a configuration allows significantly faster and/or simultaneous operation of functions maintained by the barrier operator 220 and the NORM 210. In terms of manufacturing, the instant configuration also allows the same barrier controller 284 to be utilized by both NORM enabled and non-enabled barrier operators 220, thus allowing greater economies of scale to be achieved.

Figure 7:
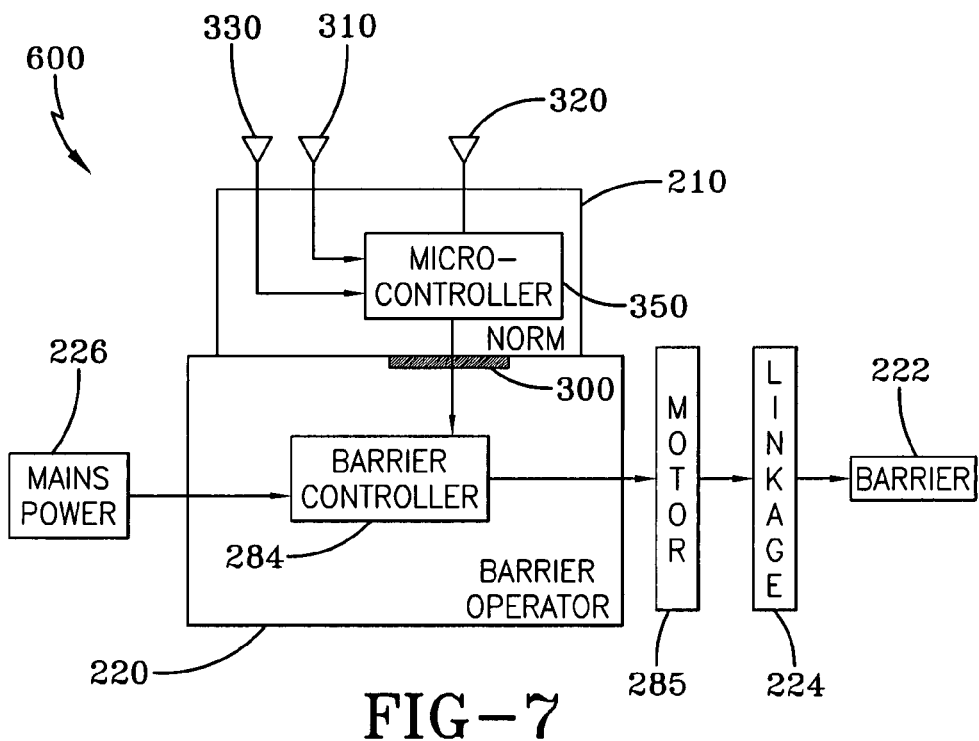
FIG. 7 is a block diagram of yet another embodiment of the network operator radio module (NORM), whereby communication signals sent to the barrier operator are first received and analyzed by the NORM module before being forwarded to the barrier operator in accordance with the concepts of the present invention.

An alternative configuration of the network operator system is referred to by the numeral 600 is shown in FIG. 7, wherein the local communication signals and the received network communication signals received by the receiver antenna 310 and the transceiver antenna 330 of the NORM 600 are processed by the NORM module 210 before being passed to the barrier controller 284. As such, the barrier controller 284 of the barrier operator 220 is placed in a "sleep" mode whereby the barrier controller 284 is powered down when no functions are currently being carried out by the barrier operator 220. As such, power is conserved and the operating life of the barrier controller 284 may be extended as a result. During operation, the various local, accessory, and network signals are authenticated using known techniques, and then analyzed to determine if the function code contained therein is associated with the local accessory 323 or the network appliance 282. If the function code is associated with the local accessory 323, the NORM 210 forwards the function code via the accessory signal to the local accessory 323 via the transmitter antenna 320. However, if the function code is not associated with the local accessory 323, but is associated with a network appliance 282, the NORM 210 forwards the function code to the communication network 252, via the transceiver antenna 330. After the function code is transmitted, it is received by the network controller module 280 where it is then routed to the appropriate network communication module 270 that maintains the appliance 282 to be controlled. Moreover, if the received function code is not associated with the local accessory 323 nor with the network appliance 282 maintained by the communication network 252, the NORM 210 "wakes," or otherwise powers the barrier controller 284 of the barrier operator 220. Once activated, the barrier controller 284 of the barrier operator 220 carries out the function associated with the received function code, such as directing the motor 285 to move the access barrier 222. As such, the configuration provided by the network operator system 600 reduces the processing load placed upon the barrier controller 284, thus allowing it to contribute more processing cycles to the carrying out of the functions maintained by the barrier operator 220, including those functions relating to the opening and closing of the barrier 222 and obstruction detection.

It will, therefore, be appreciated that one advantage of one or more embodiments of the present invention is that a network operator system for controlling local and network based accessories and appliances is provided. Still another advantage of the present invention is that a network operator radio module (NORM) is configured to convert local communication signals comprising one protocol, into network signals of another protocol for controlling a network enabled appliance. Another advantage of the present invention is the network operator radio module (NORM) may be configured such that received local and network signals are simultaneously provided to the microcontroller of the NORM module, and to the operator control board of a barrier operator. Still another advantage of the present invention is that the network operator radio module (NORM) may be configured such that received local and network signals are first processed by the NORM module before being processed by the operator control board circuitry maintained by the barrier operator.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A network operator radio module configured to be removably attached to a barrier operator for moving an access barrier between limit positions, and a network appliance, the network operator radio module comprising:
   a receiver circuit configured to receive, via a coupling to a receiver antenna, a first local communication signal containing a first command to control at least one function maintained by said network appliance;
      a transceiver circuit configured to transmit, via a coupling to a transceiver antenna, a network communication signal to a network appliance over a communication network, the communication network including a network controller;
      a microcontroller coupled to the receiver antenna coupling and the transceiver antenna coupling, wherein said microcontroller is configured to convert said first local communication signal to the network communication signal, and transmit said network communication signal to said network appliance via the transceiver circuit; and
      a communication interface configured to removably couple the network operator radio module to the barrier operator, the communication interface comprising a coupling to the receiver antenna,
      wherein the barrier operator is configured to receive and respond to a second local command signal containing a second command to control at least one function maintained by said barrier operator, said second local command signal being received via the communication interface, and
      wherein the microcontroller is further configured to receive, simultaneous to the barrier operator, and not respond to the second local command signal.

2. The network operator radio module according to claim 1, further comprising an accessory antenna coupled to said microcontroller, wherein the microcontroller is further configured to transmit an accessory signal via the accessory antenna to control a local accessory associated with said barrier operator in response to a local command signal received via the receiver antenna coupling.

3. A method for controlling a network appliance and a barrier operator, comprising:
   providing a barrier operator that moves a barrier between limit positions, said barrier operator being configured to receive, via a receiver antenna, local command signals;
   removably coupling a network operator radio module to the barrier operator using a communication interface, said network operator radio module comprising a microprocessor and a transceiver circuit configured to receive, via the receiver antenna, local communication signals;
   receiving, using the transceiver circuit of the network operator radio module, a first local communication signal, wherein the first local communications signal contains a first command to control at least one function maintained by a network appliance;
   converting, using the microprocessor of the network operator radio module, said first local communication signal to a network communication signal containing said first command;
   transmitting, using the transceiver circuit of the network operator radio module, said network communication signal containing said first command to a communication network maintaining at least one network communication module associated with said network appliance; and
   receiving, simultaneously at said barrier operator and said network operator radio module, a second local communication signal containing a second command to control at least one function maintained by said barrier operator, wherein said barrier operator is configured to respond to the second local communication signal and the network operator radio module is configured to not respond to the second local communication signal.

4. The method according to claim 3, further comprising:
carrying out said second command at said barrier operator.

5. The method according to claim 3, further comprising:
determining that said first local communication signal comprises a network appliance command associated with a network appliance function code to be carried out by said network appliance; and
transmitting said network appliance command to the at least one communication network module in response to determination that said first local communication signal contains said network appliance function code.

6. The method according to claim 5, further comprising:
carrying out said first command at said network appliance.

7. The method according to claim 3, further comprising:
transmitting status information of said barrier operator to said at least one network communication module for display.

8. The method according to claim 3, further comprising:
automatically displaying a status of said network appliance upon completion of a function performed by said network appliance.

9. The method according to claim 3, further comprising:
displaying a status of said network appliance upon completion of a function performed by said network appliance only upon specific request of a user.

10. The network operator radio module of claim 1, further comprising:
a memory unit coupled to said microcontroller, said memory unit configured to store a routing table that identifies a location of said network appliance relative to locations of one or more other network appliances of the communication network, wherein the routing table is generated by and transmitted from the network controller.

11. The method of claim 3, wherein
generating a routing table identifying a location of said network appliance relative to locations of one or more other network appliances of the communication network and transmitting the routing table to the network operator radio module for transmission of said network communication signal.

\* \* \* \* \*